(12) United States Patent
Fujii et al.

(10) Patent No.: US 9,311,494 B2
(45) Date of Patent: Apr. 12, 2016

(54) SECURE SEARCH METHOD AND SECURE SEARCH DEVICE

(75) Inventors: Yasuhiro Fujii, Tokyo (JP); Susumu Serita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 47 days.

(21) Appl. No.: 14/361,593

(22) PCT Filed: Dec. 1, 2011

(86) PCT No.: PCT/JP2011/077862
§ 371 (c)(1),
(2), (4) Date: May 29, 2014

(87) PCT Pub. No.: WO2013/080365
PCT Pub. Date: Jun. 6, 2013

(65) Prior Publication Data
US 2014/0331044 A1 Nov. 6, 2014

(51) Int. Cl.
*G06F 21/60* (2013.01)
*H04L 9/32* (2006.01)
*G06F 17/30* (2006.01)

(52) U.S. Cl.
CPC ........ *G06F 21/602* (2013.01); *G06F 17/30386* (2013.01); *G06F 17/30946* (2013.01); *G06F 17/30979* (2013.01); *H04L 9/3239* (2013.01)

(58) Field of Classification Search
CPC .................................................. G06F 21/602
USPC ........................................................ 713/165
See application file for complete search history.

(56) References Cited

U.S. PATENT DOCUMENTS

2010/0138399 A1* 6/2010 Jho ................... G06F 17/30979
707/696

FOREIGN PATENT DOCUMENTS

| JP | 2007-052698 A | 3/2007 |
| JP | 2009-271584 A | 11/2009 |
| JP | 2011-018976 A | 1/2011 |
| KR | 20080035295 A * | 4/2008 |

OTHER PUBLICATIONS

Song, D.X., et al., "Practical Techniques for Searches on Encrypted Data," Proceedings of the 2000 IEEE Symposium on Security and Privacy; 2000, 12 pages.
Yang, Z., et al., "Privacy-Preserving Queries on Encrypted Data," Proceedings of the 11*th* European Symposium On Research In Computer Security (Esorics), 2006; pp. 1-18.
Goh, Eu-Jin, "Secure Indexes,"Cryptology ePrint Archive, Report 2003/216 (2003), pp. 1-19.

(Continued)

*Primary Examiner* — Jacob Lipman
(74) *Attorney, Agent, or Firm* — Foley & Lardner LLP

(57) ABSTRACT

In search that uses searchable code, the search query and the secure index is collated in round-robins fashion, registering the required secure index and a characteristic quantity of deposited data in a database server to realize the searchable code. The server uses the characteristic quantity to perform clustering on the secure index. For search, collation is first performed only for representative data of a cluster. For a hit, the collation priority is raised for all the data included in the cluster. When there is no hit, the priority is lowered. After calculating the priority, collation is performed sequentially for all the data on the basis of the priority.

7 Claims, 14 Drawing Sheets

(56) References Cited

OTHER PUBLICATIONS

Suga, T., et al., "Design, Implementation and Evaluation of Symmetric Key Encryption with Flexible Keyword Search by Using Bloom Filter," IEICE Technical Report vol. 111, No. 30, pp. 1-7.

Suga, T., et al., "Secure Keyword Search Using Bloom Filter with Specified Character Positions," ProvSec 2012 LNCS 7496, pp. 235-252; Springer-Verlag Berlin Heidelberg 2012.

Del Bimbo, A., "Visual Information Retrieval," pp. ix, 22-29; 1999; Morgan Kaufmann publishers, Inc., CA, USA.

Serita, S., et al., "Similiarity Hashing resistant to file modifications," The Institute of Electronics, Information and Communication Engineers, IEICE Technical Report, vol. 110, No. 282; 2010; pp. 31-36.

Bishop, C.M., "Pattern Recognition and Machine Learning", Microsoft Research Ltd., pp. xvii, 424-430, 2006 Springer Science +Business Media, LLC.

Murtagh, F., "A Survey of Recent Advances in Hierarchial Clustering Algorithms," The Computer Journal, 1983, pp. 354-359, vol. 26, No. 4.

PCT International Search Report on applicaton PCT/JP2011/077862 mailed Feb. 14, 2012; 2 pages.

* cited by examiner

REGISTERED CLIENT 20, SEARCH CLIENT 30

FIG. 6

REGISTERED DATA STORAGE LOCATION MANAGEMENT TABLE 60

| REGISTERED DATA ID (600) | ENCRYPTED DATA (602) | SECURE INDEX (604) | CHARACTERISTIC QUANTITY (606) | REGISTERED CLIENT (608) | ... (610) |
|---|---|---|---|---|---|
| 1 | AAAA | HHHH | 0x23451 | 133.1.2.3 | ... |
| 2 | BBBB | GGGG | 0xfff723 | 146.25.0.1 | ... |
| ... | ... | ... | ... | ... | ... |

CLUSTER MANAGEMENT TABLE 62

| CLUSTER ID (620) | REGISTERED DATA ID (622) | ... (624) |
|---|---|---|
| 1 | 1, 4, 23, 46, ... | ... |
| 2 | 2, 28, 53, 120, ... | ... |
| ... | | ... |

FIG. 11
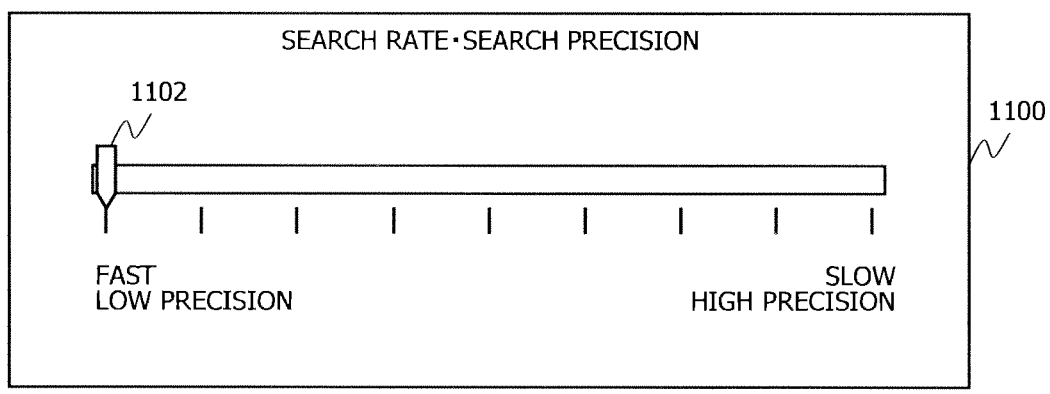
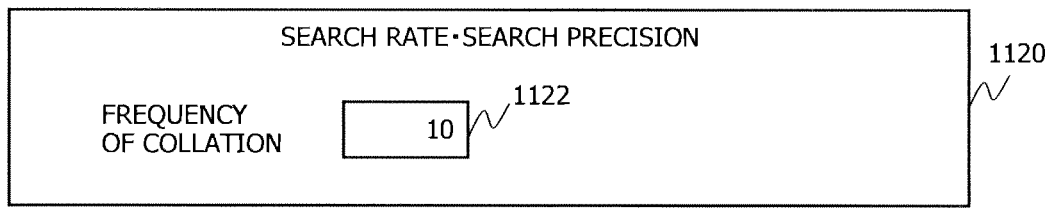

SECURE SEARCH METHOD AND SECURE SEARCH DEVICE

TECHNICAL FIELD

The present invention relates to a secure search system using a searchable code that searches encrypted data deposited in a server without decrypting in a client server model such as cloud computing.

BACKGROUND ART

The deposition of information in a database server is actively used by the popularization of cloud computing. In the meantime, the leakage of confidential information such as personal information is also becoming a great social problem.

To securely deposit information in a database server while preventing the leakage of the information, searchable code technique that enables searching deposited data in an encrypted state is proposed. Information can be prevented from leaking to not only a third party on a channel but a database server manager by using a searchable code.

For the searchable code technique, various methods are proposed. A search using a searchable code is generally performed according to the following procedure.

(1) A client that deposits data calculates an index representing contents of the deposited data and secures it. In this case, securing means processing proper to a searchable code which makes it difficult to acquire the contents of the deposited data based upon the corresponding index. Hereinafter, the index that is secured is called secure index.

(2) The client encrypts the deposited data (hereinafter called encrypted data) and transmits it to a database server together with the secure index.

(3) The database server registers a pair of the encrypted data and the secure index in a database.

(4) The search client that searches the data calculates a trapdoor of a keyword (a search query) to be searched. In this case, the trapdoor means information for a search and especially, means the secure keyword for a search included in the search query.

(5) The search client transmits the trapdoor to the database server.

(6) The database server searches data that hits the search query by collating the secure index registered in the database and the trapdoor in a procedure proper to the searchable code.

(7) The database server transmits encrypted data corresponding to the hit secure index and the like to the search client.

(8) The search client specifies a client that deposits data based upon a received search result and shares a decrypting key with the corresponding client.

(9) The search client decrypts the encrypted data received from the database server using the shared key.

As the deposited data is encrypted, it is substantially impossible that a database server manager decrypts the deposited data. In addition, since the index is secured, it is difficult to extract contents of the deposited data based upon the index. Further, since the search query is converted to the trapdoor, the possibility of the leakage of the search query is also low. Further, since it is also difficult to determine whether different secure indexes include the same keyword or not, unjust attack such as frequency analysis that estimates an unciphered text based upon the frequency of appearance of a word can be prevented. As described above, information can be substantially prevented from leaking not only to a third party on a channel but to the database server manager and the like by using searchable code technique.

For the searchable code technique, Non-patent Literature 1 and Non-patent Literature 2 are known for example. These methods adopt a random encryption method in which an unciphered text and its encrypted text have the complex correlation of 1 to m and which is securer than a deterministic encryption method in which an unciphered text and its encrypted text have the simple correlation of 1 to 1. These methods are relatively secure from attack such as frequency analysis.

In addition, Non-patent Literature 3, Non-patent Literature 4 and Patent Literature 1 are also known. In methods disclosed in Non-patent Literature 3 and Non-patent Literature 4, tolerance to attack such as frequency analysis is also applied by utilizing Bloom filter which is one of random data structure. In a method disclosed in Patent Literature 1, tolerance to attack such as frequency analysis is also applied by using Fuzzy Vault Scheme for realizing fuzzy collation between clusters using an error-correcting code.

The techniques disclosed in Non-patent Literatures 1 to 4 and Patent Literature 1 guarantee security from frequency analysis by utilizing random encryption, random data structure, fuzzy collation technique and the like. For a concrete example, when plural data pieces including a keyword "cloud" are deposited in the database server, a corresponding secure index is different for each deposited data piece. Further, it is difficult to determine that the secure indexes include the same keyword "cloud". Furthermore, even if a search is made based upon "cloud", it is difficult to guess a search query "cloud" based upon a trapdoor. Therefore, even if a fact that the search query is hit is known, the database server manager cannot substantially know whether the secure index includes "cloud" or not.

CITATION LIST

Patent Literature

Patent Literature 1: JP-A No. 2009-271584

Non-Patent Literature

Non-patent Literature 1: Dawn Xiaodong Song, David Wagner and Arian Perrig: "Practical Techniques for Searches on Encrypted Data," In Proceedings of the 2000 IEEE Symposium on Security and Privacy, pp. 44-55 (2000).

Non-patent Literature 2: Zhigiang Yang, Sheng Zhong, Rebecca N. Wright: "Privacy-Preserving Queries on Encrypted Data," In Proceedings of the 11th European Symposium on Research in Computer Security (Esorics), Vol. 4189 of Lecture Notes in Computer Science, pp. 476-495 (2006).

Non-patent Literature 3: Eu-Jin Goh: "Secure Indexes," Cryptology ePrint Archive, Report 2003/216 (2003).

Non-patent Literature 4: Takanori Kan, Takashi Nishide, Yoshiaki Hori, Koichi Sakurai: "Design Implementation and Evaluation of Symmetric Key Encryption with Flexible Keyword Search by Using Bloom Filter", IEICE technical report Vol. 111, No. 30, pp. 111-116 (2011).

Non-patent Literature 5: A. D. Bimbo: "Visual Information Retrieval", Morgan Kaufmann Publishers (1999).

Non-patent Literature 6: Susumu Serita, Yasuhiro Fujii, Masaru Kai, Takao Murakami, Yoshinori Honda: "Similarity Hashing resistant to file modifications", IEICE technical report Vol. 110, No. 282, pp. 31-36 (2010).

Non-patent Literature 7: C. M. Bishop: "Pattern Recognition and Machine Learning", Springer Japan Inc. (2007).

Non-patent Literature 8: F. Murtagh: "A Survey of Recent Advances in Hierarchical Clustering Algorithms", The Computer Journal, vol. 26, pp. 354-359 (1983).

SUMMARY OF INVENTION

Technical Problem

Generally, in a search of a character string, search response time is reduced by providing a word and an index (an inverted index) of a document including the word. When no index exists, a search query and deposited data are required to be collated in a round-robin fashion every time and a search response is greatly delayed.

In techniques disclosed in Non-patent Literatures 1 to 4 and in JP-A No. 2009-271584, as tolerance to attack such as frequency analysis is applied, it is difficult to determine what word a secure index includes. That is, it is substantially impossible to configure an index such as an inverted index. Therefore, in these techniques, a search query and a secure index are required to be collated in round-robin fashion every time and a search response is greatly displayed. An object of the present invention is to accelerate a search in a secure search system using a searchable code.

Solution to Problem

To achieve the object, the present invention provides means for registering not only encrypted data and a secure index but characteristic quantity of deposited data in a database server. In this case, the characteristic quantity means data length which is greatly reduced to minimize impairing of characteristics of deposited data and the similarity of deposited data can be calculated using only characteristic quantity. However, it is defined difficult to guess original data based upon characteristic quantity. For characteristic quantity, a characteristic vector calculated based upon a word and the like in deposited data and quantity called a fuzzy hash acquired by dividing deposited data, calculating a hash value and connecting the hash values are known.

Next, the present invention provides means for calculating the similarity of deposited data corresponding to a characteristic quantity on the side of the database server using the characteristic quantity received together with encrypted data and a secure index and clustering secure indexes and the like so that similar deposited data are included in the same cluster.

Further, the present invention provides means for first selecting a representative (hereinafter called a pivot) of secure indexes in each cluster in a secure search process, collating the pivot and a trapdoor (acquired by securing a search keyword included in a search query), ranking the priority of the collation of all registered data included in the cluster to which the pivot belongs and the trapdoor in higher rank when the pivot hits the trapdoor and ranking the priority of the collation of all the registered data included in the cluster to which the pivot belongs and the trapdoor in lower rank when the pivot does not hit the trapdoor. The acceleration of the secure search process is realized by sequentially collating all registered data and the trapdoor after the priority of the objects to be collated is determined and discontinuing the collation at fixed times, inhibiting the deterioration of security and search precision.

Advantageous Effects of Invention

In a secure search system that searches without decrypting encrypted data deposited in a database server, a secure search can be accelerated by clustering secure indexes using a characteristic quantity the original data of which is difficult to guess, inhibiting the deterioration of security and search precision.

BRIEF DESCRIPTION OF DRAWINGS

FIG. 6 shows the data configuration of a registered data storage location management table and a cluster management table respectively prepared by the database server in the embodiment of the present invention.

FIG. 11 shows a setting screen in the search client or the database server in the embodiment of the present invention.

DESCRIPTION OF EMBODIMENTS

Figure 1:
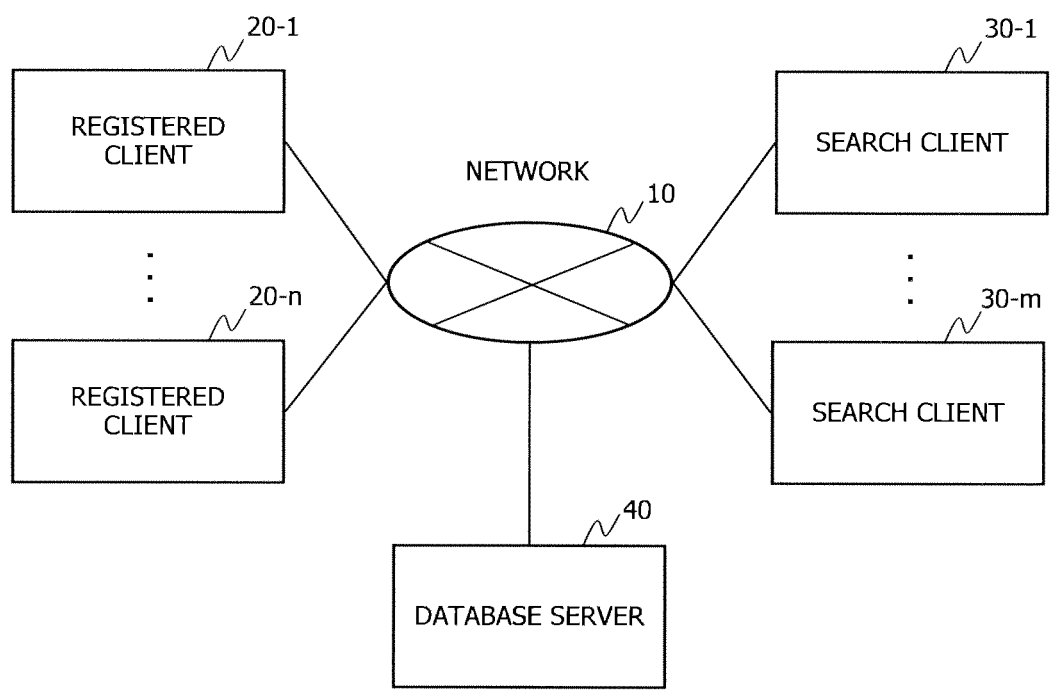
FIG. 1 shows an outline of a secure search system in an embodiment of the present invention.

Referring to the drawings, an embodiment of the present invention will be described in detail below.

(System Configuration)

FIG. 1 is a schematic diagram showing a secure search system equivalent to an embodiment of the present invention. As shown in FIG. 1, the search system is provided with "n" registered clients 20-1 to 20-$n$, "m" search clients 30-1 to 30-$m$ and a database server 40, and is designed so that these can mutually transmit and receive information via a network 10. In this case, "n" and "m" are 1 or a larger integer, and "n" and "m" may also be different. Registered clients 20-1 to 20-$n$ have the same configuration. An arbitrary one of them will be called a registered client 20 below. Similarly, search clients 30-1 to 30-$m$ have the same configuration. An arbitrary one of them will be called a search client 30 below.

The registered client 20 in this embodiment functions as a transmitter-receiver for registering data that transmits encrypted deposited data and the like to the database server 40. The search client 30 functions as a transmitter-receiver for a search that transmits a secure search query to the database server 40 and receives a result of the search. The database server 40 functions as a secure search device that registers the encrypted deposited data and the like in a database and searches data in the database.

(Registered Client)

Figure 2:
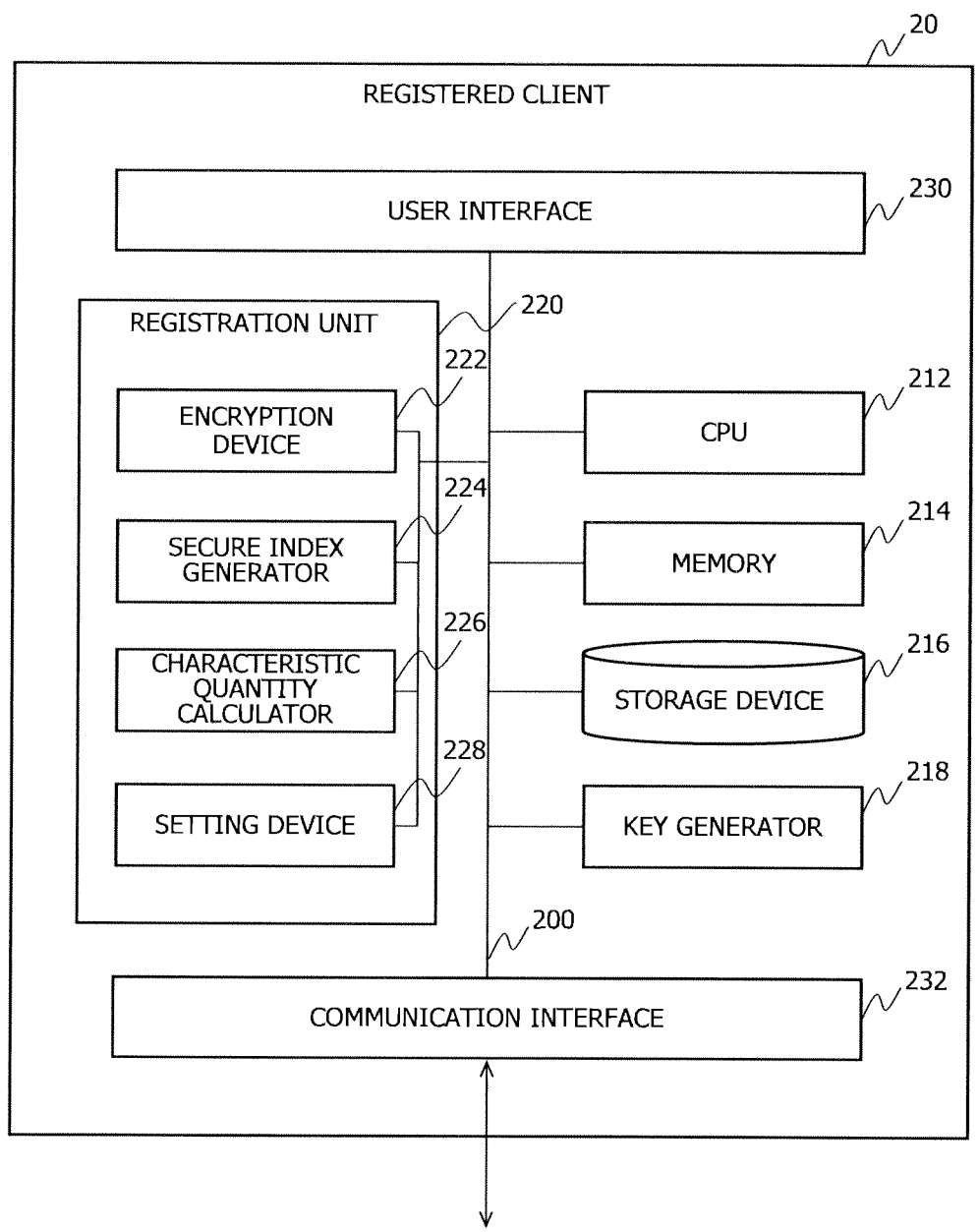
FIG. 2 shows the schematic configuration of a registered client in the embodiment of the present invention.

FIG. 2 shows the schematic configuration of the registered client 20. As shown in FIG. 2, the registered client 20 is provided with CPU 212, a memory 214, a storage device 216, a key generator 218, a registration unit 220, a user interface 230 and a communication interface 232, and is designed so that these can mutually transmit and receive information via an internal bus 200. The registration unit 220 is provided with an encryption device 222, a secure index generator 224, a characteristic quantity calculator 226 and a setting device 228. These devices can independently transmit and receive information to/from the CPU 212 and the like via a hub 200.

First, general components will be described. The CPU 212 is a central processing unit that calculates various numeric values, processes information and controls equipment. The memory 214 is a semiconductor storage device such as RAM and ROM from/to which the CPU 212 can directly read and write information. For the storage device 216, a hard disk, a magnetic tape, a flash memory and the like which respectively store data and a program in a computer can be given. The corresponding device stores data deposited in the database server 40.

The key generator 218 generates a key and the like for encrypting or decrypting data and further, executes processing for sharing the decrypting key with the search client 30. The sharing of the decrypting key will be described using FIG. 7 later.

For the user interface 230, a display, a mouse, a keyboard and the like which respectively output a result of processing to a user and respectively reflect it in each component of the registered client 20 at the request of the user can be given. The communication interface 232 controls the transmission and the reception of data between each component of the registered client 20 and an external device such as the search client 30 and the database server 40.

Components proper to the present invention are the registration unit 230 and a group which configures the registration unit and includes the encryption device 222, the secure index generator 224, the characteristic quantity calculator 226 and the setting device 228. Of these, the most characteristic component that is not included in conventional type searchable code technique is the characteristic quantity calculator 226. First, the components of the registration unit 220 will be described.

The encryption device 222 reads data deposited in the database server 40 from the storage device 216, encrypts the data using an encryption key generated in the key generator 218, notifies the registration unit 220 of the encrypted data or temporarily outputs the encrypted data to the memory 214 or the storage device 216.

The secure index generator 204 reads data deposited in the database server 40 from the storage device 216, generates a secure index based upon contents of the deposited data according to algorithm proper to a searchable code, notifies the registration unit 220 of the generated secure index or temporarily outputs the generated secure index to the memory 214 or the storage device 216. A concrete procedure for generating the secure index will be described using FIG. 5 later.

The characteristic quantity calculator 206 reads data deposited in the database server 40 from the storage device 216, calculates a characteristic quantity of the deposited data according to predetermined algorithm, notifies the registration unit 220 of the calculated characteristic quantity or temporarily outputs the calculated characteristic quantity to the memory 214 or the storage device 216. A concrete procedure for calculating the characteristic quantity will be described using FIG. 5 later.

The setting device 228 sets a parameter required for processing such as encryption, the generation of a secure index and the calculation of characteristic quantity. The corresponding parameter is set by a user via the user interface 230 and is reflected in the registration unit 220, the encryption device 222, the secure index generator 224 and the characteristic quantity calculator 226.

The registration unit 220 receives an instruction for registration in the database server 40 from a user via the user interface 230, controls the encryption device 222, the secure index generator 224 and the characteristic quantity calculator 226 for instructed data stored in the storage device 216, calculates the encrypted data, a secure index and a characteristic quantity respectively included in a set of them, and transmits the set including the calculated respective ones to the database server 40 via the communication interface 232. The details of the registration of data will be described using FIG. 5 later.

As for the key generator 218, the registration unit 220 and the group of the encryption device 222, the secure index generator 224, the characteristic quantity calculator 226 and the setting device 228 which respectively configure the registration unit, the respective devices may also independently execute processing and the CPU 212 may also execute processing by providing only a program to each device and reading the corresponding program in the memory 214.

(Search Client)

Figure 3:
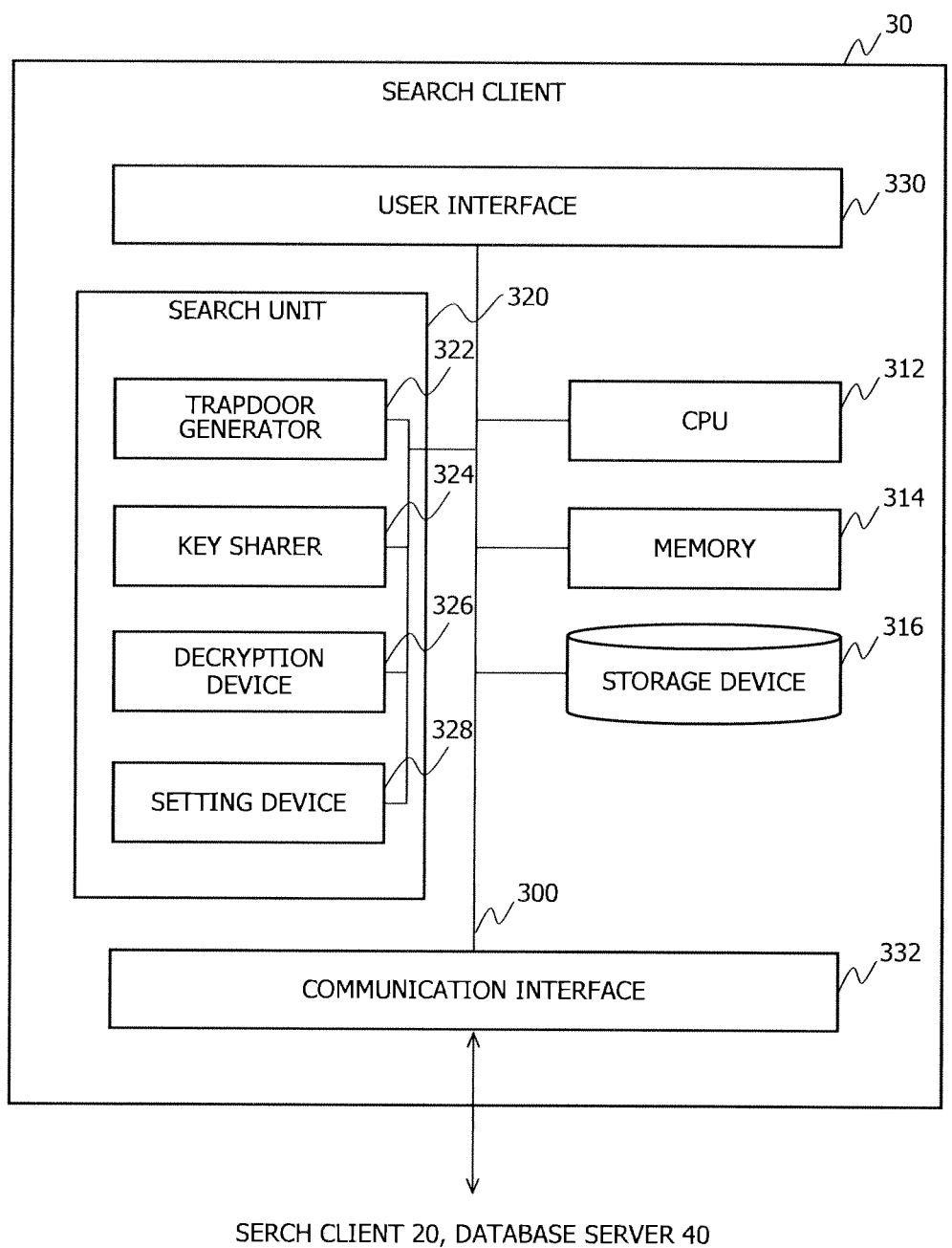
FIG. 3 shows the schematic configuration of a search client in the embodiment of the present invention.

FIG. 3 shows the schematic configuration of the search client 30. As shown in FIG. 3, the search client 30 is provided with a CPU 312, a memory 314, a storage device 316, a search unit 320, a user interface 330 and a communication interface 332, and is designed so that these can mutually transmit and receive information via an internal bus 300. In addition, the search unit 320 is provided with a trapdoor generator 322, a key sharer 324, a decryption device 326 and a setting device 328. These devices can independently transmit and receive information to/from the CPU 312 and the like via the internal bus 300 mutually. A trapdoor means information for a search and is acquired by securing a search keyword included in a search query.

The CPU 312, the memory 314, the storage device 316, the user interface 330 and the communication interface 332 which are respectively a general component have the similar function to the function described in relation to FIG. 2. For components proper to the present invention, the search unit 320 and a group of the trapdoor generator 322, the key sharer 324, the decryption device 326 and the setting device 328 which respectively configure the search unit can be given. The description of the general components such as the CPU 312 is omitted and the components of the search unit 320 will be described below.

The trapdoor generator 322 receives a search query from a user via the user interface 330, generates a trapdoor by securing a keyword included in the search query according to algorithm proper to a searchable code, notifies the search unit 320 of the generated trapdoor or outputs the generated trapdoor to the memory 314 or the storage device 316. A concrete procedure for generating the trapdoor will be described using FIG. 7 later.

The key sharer 324 is a device for sharing a decrypting key of the corresponding encrypted data with the registered client 20 when the key sharer receives the encrypted data that hits the search query from the database server 40. The shared decrypting key is temporarily stored in the search unit 320 or in the memory 314 or in the storage device 316. A concrete process for sharing the key will be described using FIG. 7 later.

The decryption device 326 decrypts the encrypted data received from the database server 40 using the decrypting key acquired by the key sharer 324, notifies the search unit 320 of it or temporarily outputs it to the memory 314 or the storage device 316.

The setting device 328 sets a parameter required for processing such as the generation of a trapdoor, the sharing of a key and decryption. The corresponding parameter is set by a user via the user interface 330 and is reflected in the search unit 320, the trapdoor generator 322, the key sharer 324 and the decryption device 326. One example of the setting of a parameter will be described using FIG. 11 later.

The search unit 320 receives a search query from a user via the user interface 330, controls the trapdoor generator 322, generates a trapdoor based upon the search query, transmits the generated trapdoor to the database server 40, decrypts encrypted data returned from the database server 40 under control over the key sharer 324 and the decryption device 326, outputs the decrypted data to the memory 314 or the storage device 316 or provides it to the user via the user interface 330. The details of the process will be described using FIG. 7 later.

As for the search unit 320 and the group of the trapdoor generator 322, the key sharer 324, the decryption device 326 and the setting device 328 which respectively configure the search unit 320, the respective devices may also independently execute processing and the CPU 312 may also execute processing by providing only a program to each device and reading the corresponding program in the memory 314.

(Database Server)

Figure 4:
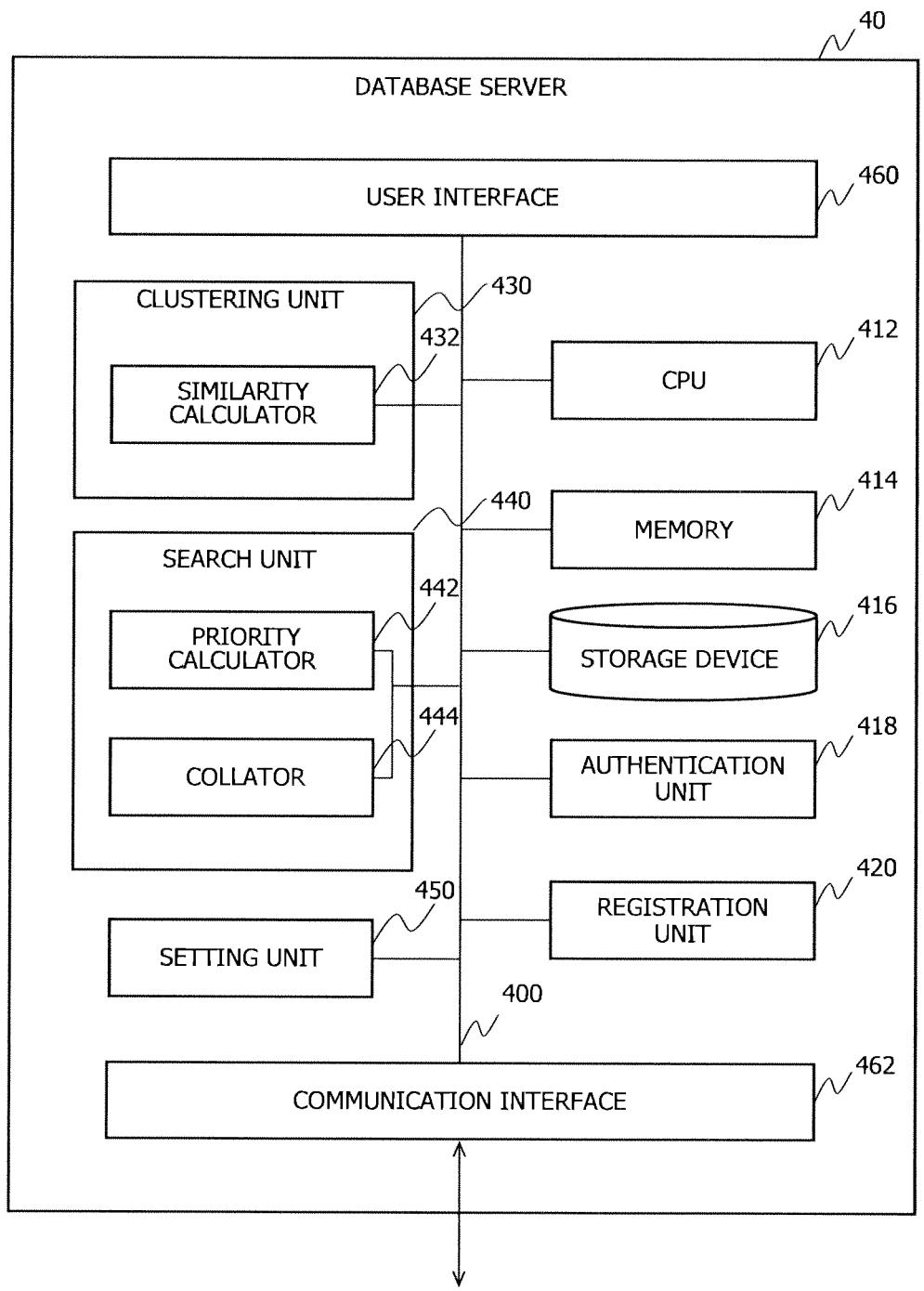
FIG. 4 shows the schematic configuration of a database server in the embodiment of the present invention.

FIG. 4 shows the schematic configuration of the database server 40. As shown in FIG. 4, the database server 40 is provided with a CPU 412, a memory 414, a storage device 416, an authentication unit 418, a registration unit 420, a clustering unit 430, a search unit 440, a setting unit 450, a user interface 460 and a communication interface 462, and is designed so that these can mutually transmit and receive information via an internal bus 400. In addition, the clustering unit 430 is provided with a similarity calculator 432. The similarity calculator 432 can independently transmit and receive information to/from the CPU 412 via the internal bus 400 mutually. Moreover, the search unit 440 is provided with a priority calculator 442 and a collator 444. These devices can also independently transmit and receive information to/from the CPU 412 via the internal bus 400 mutually.

The description of the CPU 412, the memory 414, the storage device 416, the user interface 460 and the communication interface 462 which are respectively general components is omitted because they have a similar function to the function described in relation to FIG. 2.

The authentication unit 418 manages ID and a password of a user based upon which the registration and a search of data in the database server 40 are allowed. The details will be described using FIG. 5 later.

For components proper to the present invention, the registration unit 420, the clustering unit 430, the similarity calculator 432 which configures the clustering unit, the search unit 440, the priority calculator 442 and the collator 444 which respectively configure the search unit, and the setting unit 450 can be given.

The registration unit 420 registers a set of encrypted data, a secure index and a characteristic quantity in the storage device 416 when the registration unit receives the set from the registered client 20. Hereinafter, this set is called registered data. The concrete contents of registration will be described using FIG. 6 later.

The clustering unit 430 clusters registered data registered in the storage device 416 and temporarily outputs a result of clustering to the memory 414 or the storage device 416. For clustering, similarity between registered data is required to be calculated. However, the similarity calculator 432 performs this calculation using characteristic quantity in the registered data. Concrete processing for clustering will be described using FIG. 5 later. In addition, FIG. 6 takes up a concrete example of a result of clustering.

The similarity calculator 432 calculates the similarity of two registered data pieces according to a request from the clustering unit 430. The clustering unit 430 temporarily stores registered data pieces the similarity of which is calculated in the memory 414 or the storage device 416, or directly notifies the similarity calculator 432. The calculated similarity is temporarily output to the memory 414 or the storage device 416, or is directly returned to the clustering unit 430. A concrete procedure for calculating similarity will be described using FIG. 5 later.

The search unit 440 receives a trapdoor of a search query from the search client 30 and returns encrypted data that hits the search query to the search client 30 via the communication interface 442. When the search unit 440 receives the trapdoor, it first activates the priority calculator 442.

The priority calculator 442 calculates the priority of collation based upon the result of clustering by the processing of the clustering unit 430. The priority calculator compares a pivot which is a secure index that represents secure indexes of each cluster and the trapdoor and determines priority in collating each cluster. The calculated priority is temporarily output to the memory 414 or the storage device 416 or is directly returned to the search unit 430. A concrete procedure for calculating priority will be described using FIG. 8 later. The pivot of each cluster is set/determined in the clustering unit 430 or the priority calculator 442.

Next, the search unit 440 calls the collator 444 and instructs the collator to collate the trapdoor and the secure index in order in which priority is higher according to the priority stored in the memory 414 or the storage device 416 or the search unit 430. The search unit 440 temporarily stores the trapdoor and the secure index respectively to be collated in the memory 414 or the storage device 416 or directly passes them to the collator 444. The collator 444 collates the trapdoor and the secure index according to algorithm proper to a searchable code and temporarily outputs a result of the collation to the memory 414 or the storage device 416, or directly passes the result of the collation to the search unit 440. A concrete procedure for collation will be described using FIG. 9 later.

In the related art, all registered data is required to be collated with the trapdoor in round-robin fashion. However, the great reduction of search response time is realized because the priority calculator 442 sets priority in collating registered data using characteristic quantity, the search unit 440 collates the trapdoor and the secure index in the order in which the priority is higher and the collation is discontinued at a fixed frequency. Further, as it is difficult to estimate original contents of deposited data based upon a characteristic quantity, the deterioration of security can be inhibited. A concrete procedure for a search will be described using FIGS. 7 to 10 later.

The setting unit 450 sets a parameter required for processing such as clustering and a search. The parameter is set by a database server manager via the user interface 460 and is reflected in the registration unit 420, the clustering unit 430, the similarity calculator 432, the search unit 440, the priority calculator 442 and the collator 444.

As for the authentication unit 418, the registration unit 420, the clustering unit 430, the similarity calculator 432, the search unit 440, the priority calculator 442, the collator 444 and the setting unit 450, the respective devices may also independently execute processing and the CPU 412 may also execute processing by providing only a program to each device and reading the corresponding program in the memory 414.

(Summary of Processing)

Figure 12:
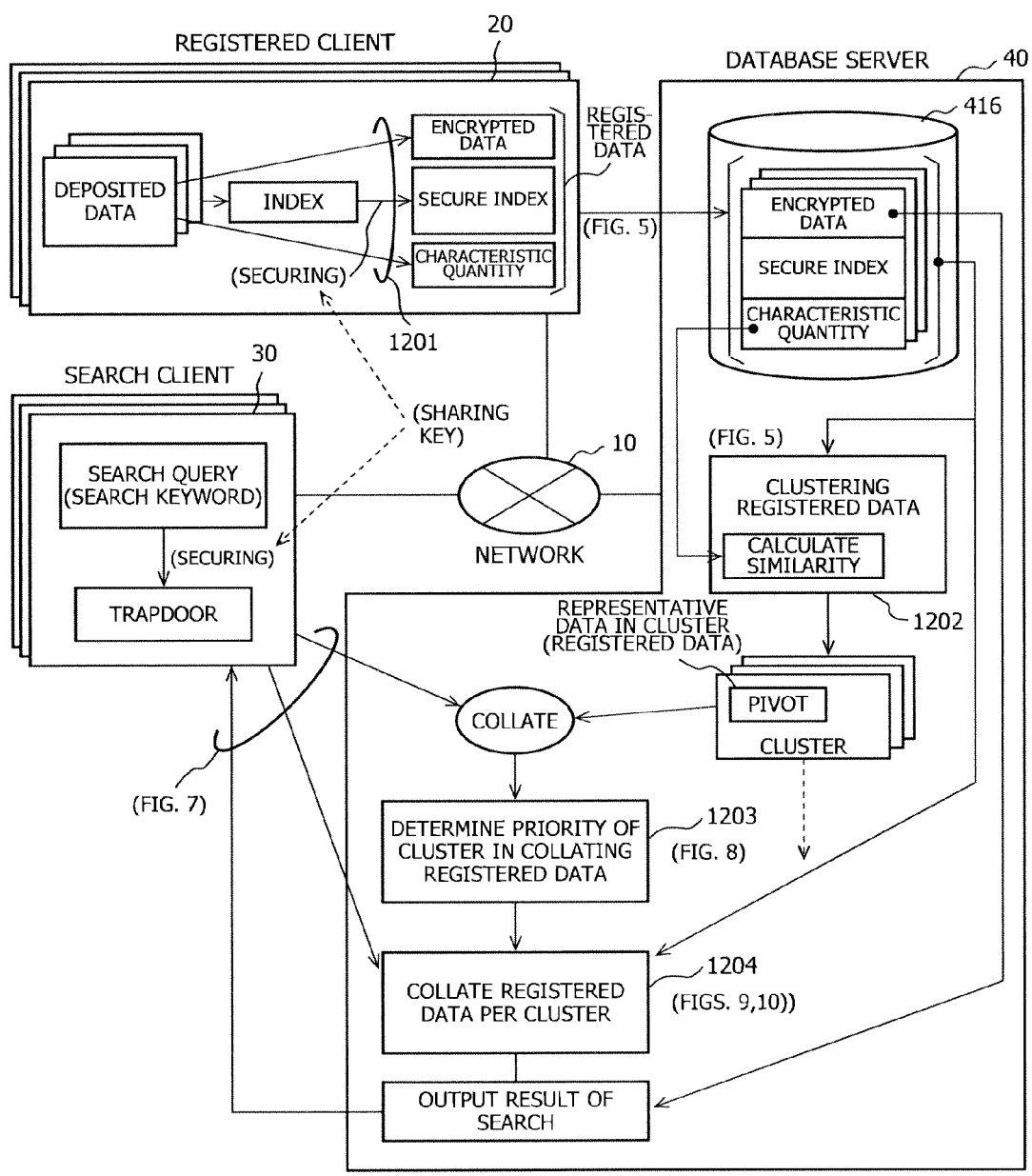
FIG. 12 shows an outline of processing in the present invention.

First, an outline of processing by the secure search method according to the present invention will be described using FIG. 12.

(1) The registered client registers not only encrypted data acquired by encrypting deposited data and a secure index acquired by securing an index extracted from the deposited data but the characteristic quantity of the deposited data in the database server (1201). In this case, the characteristic quantity is acquired by greatly reducing data length without possibly impairing a characteristic of the deposited data and for an example, a characteristic vector calculated based upon a word and the like in the deposited data and quantity called a fuzzy hash acquired by dividing the deposited data, calculating a hash value and connecting the divided parts can be given.

(2) The database server calculates the similarity of the deposited data corresponding to the characteristic quantity using the received characteristic quantity and clusters the secure index and the like so that similar deposited data is included in the same cluster (1202).

(3) The database server first selects a representative (a pivot) of secure indexes in each cluster in a secure search process and determines the priority of the cluster in collating registered data by collating the pivot and a trapdoor acquired in securing a search keyword included in a search query in the search client (1203).

(4) The database server collates all registered data in the unit of the cluster based upon the priority (1204) and outputs a result of the search to the search client.

In determining the priority, when the pivot hits the trapdoor, the priority of the collation with the trapdoor of all the registered data included in the cluster to which the pivot belongs is raised and when the pivot does not hit the trapdoor, the priority of the collation of all the registered data included in the cluster to which the pivot belongs is lowered. Further, to accelerate the secure search process, when all the registered data is sequentially collated after the priority of objects to be collated is determined, collation is discontinued at the fixed frequency.

(Data Registration Process)

Figure 5:
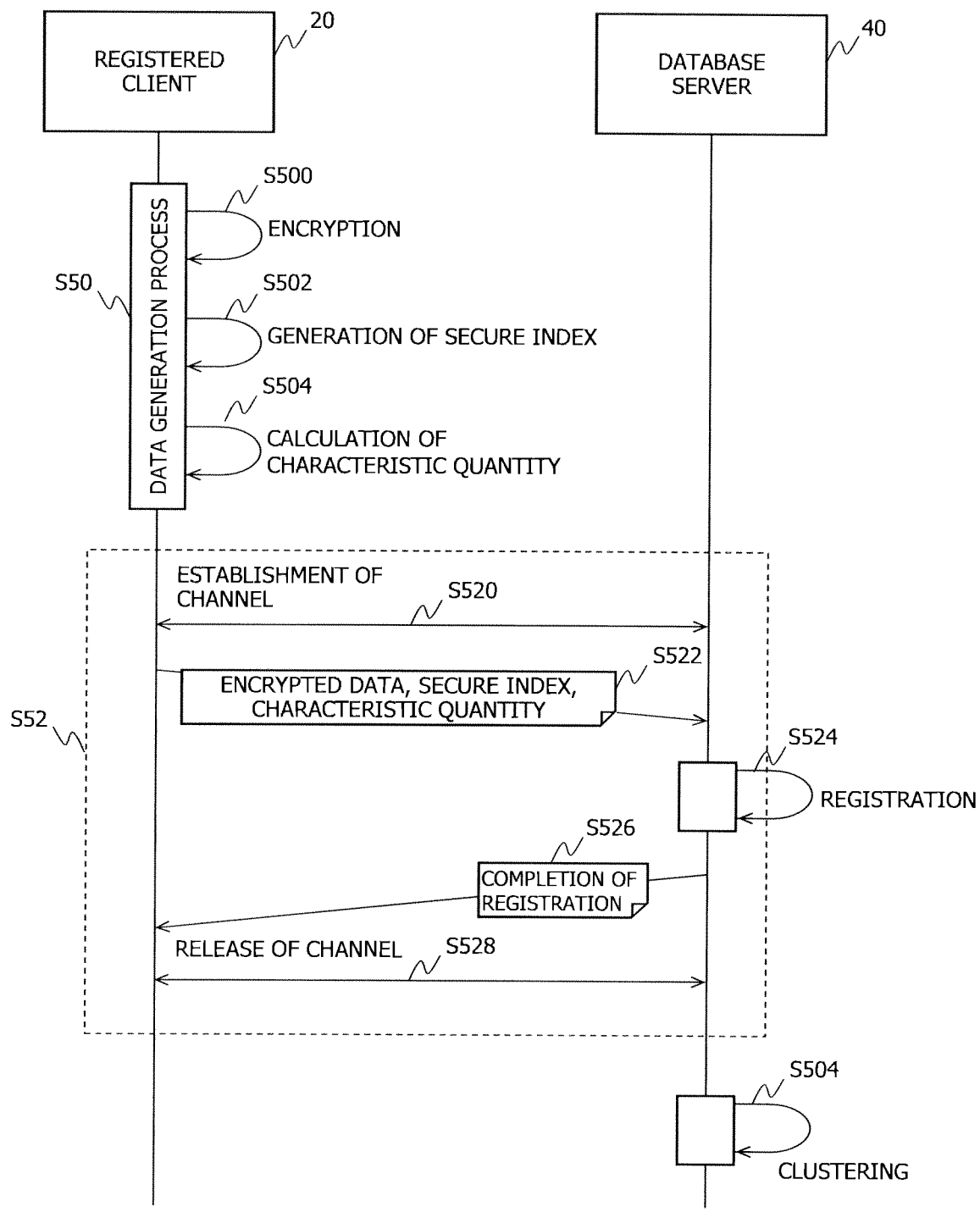
FIG. 5 shows a sequence of a data registration process between the registered client and the database server in the embodiment of the present invention.

FIG. 5 shows a sequence of a data registration process between the registered client 20 and the database server 40. Referring to FIG. 5, the data registration process will be described and concrete contents of the procedure for generating the secure index and the procedure for calculating a characteristic quantity respectively described in relation to FIG. 2 and the clustering process and the procedure for calculating similarity respectively described in relation to FIG. 4 will also be described below.

The data registration in the database server 40 by the registered client 20 roughly includes a data generation process S50 in which the registered client 20 generates registered data, a data transmission/reception process S52 in which the registered client 20 and the database server 40 transmit/receive data and a clustering process S54 in which the database server 40 clusters the registered data.

The data generation process S50 proceeds in the following procedure.

(S500) A user of the registered client 20 designates data to be registered in the database server 40 via the user interface 230. The registration unit 220 that receives the designation first activates the key generator 218. The key generator 218 generates a pair of an encryption key and a decryption key and stores the pair in the memory 214 or the storage device 216. The encryption device 222 applies an encryption process to the data (the deposited data) designated to be registered using the encryption key generated by the key generator 218. Since the generated decryption key may be transmitted to an external device at the request of the search client 30 later, the storage device 216 or the key generator 218 itself holds it.

Figure 13:
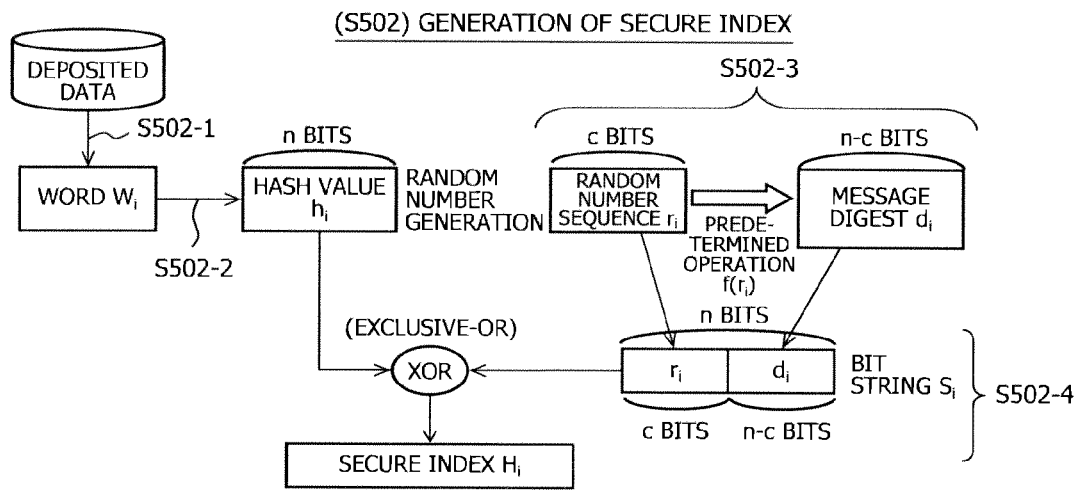
FIG. 13 shows a procedure for generating the secure index.

(S502) The secure index generator 224 generates a secure index based upon contents of the deposited data. A concrete generation method based upon Non-patent Literature 1 is as follows. FIG. 13 shows a procedure for generating the secure index.

(S502-1) Words (w1, w2, - - - ) to be collated are extracted from the deposited data. The extraction of words is performed by extracting a character string delimited by a blank in English. In the case of Japanese, words can be extracted by a method (N-gram) of decomposing a sentence in the deposited data into character strings of fixed length and morphological analysis.

(S502-2) Respective hash values (h1, h2, - - - ) of the extracted words (w1, w2, - - - ) are calculated. Bit length of each hash value shall be n.

(S502-3) A random number sequence ri (i=1, 2, of c bits is generated for each hash value hi. A message digest di of (n-c) bits is acquired by performing predetermined operation for each random number sequence ri. The predetermined operation for calculating the digest depends upon another hash function that is different from the case that the hash value is calculated based upon the word as described above for example.

(S502-4) The message digest di is connected to an end of the random number sequence ri and a bit string si (i=1, 2, - - - ) of the length of n is acquired. The exclusive-OR of each hash value hi and the bit string si becomes a secure index Hi.

Next, the representation of the secure index Hi acquired in the steps S502-1 to 4 will be described referring to FIG. 13. When the exclusive-OR is expressed by "XOR" and the connection of two bit strings is expressed by "|", the secure index Hi is represented as Hi=hiXOR (ri|di) using hi (the hash value of the word wi) and (ri|di) (the bit string si configured by the random number sequence ri and the message digest di). However, a hash value hi of a word Wi, a random number sequence ri and a message digest di are respectively generated by a hash function h (Wi)=hi, the generation of a random number R (hi)=ri and predetermined operation f (ri)=di.

Since not a word itself but a hash value is used and the exclusive-OR of the hash value and a random number sequence is calculated, it is difficult to acquire words in the deposited data based upon a secure index. For the details, refer to Non-patent Literature 1. A method of collating the secure index acquired as described above and a trapdoor will be clarified in the following description in relation to FIG. 8.

(S504) The characteristic quantity calculator 226 calculates a characteristic quantity based upon contents of the deposited data. For the characteristic quantity, a method of using attribute information such as the size of the deposited data which is difficult to arbitrarily change and which has a continuous value can be first given. When the size of deposited data is a characteristic quantity, the similarity of two deposited data pieces can be made to approximate to 1/(1+ |s1−s2|) in a case that the size of the deposited data is s1, s2. The similarity has values of 0 to 1 and the more similar deposited data pieces are, the closer to 1 the similarity is.

Figure 15:
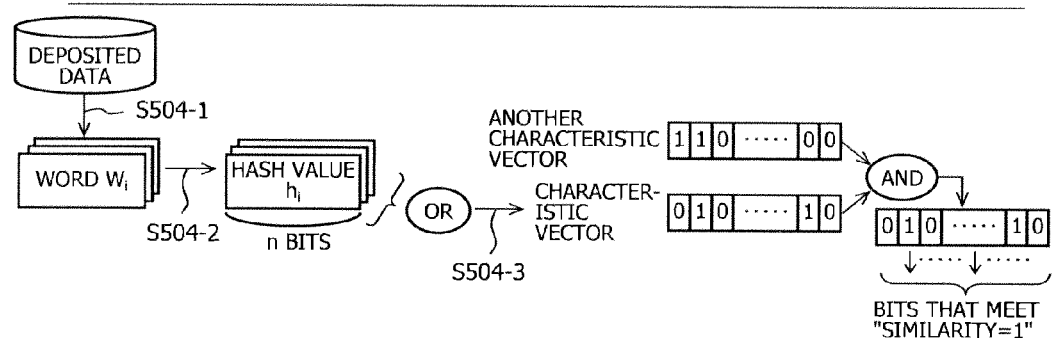
FIG. 15 shows a procedure for generating a characteristic quantity vector based upon deposited data.

For more refined characteristic quantity, a method of generating a vector (a characteristic vector) based upon a word in deposited data is known. The characteristic vector is acquired according to the following procedure. FIG. 15 shows a procedure for generating a characteristic vector.

(S504-1) Words (w1, w2, - - - ) which are an object to be collated are extracted from the deposited data.

(S504-2) Respective hash values (h1, h2, - - - ) of the extracted words (w1, w2, - - - ) are calculated. Bit length of each hash value shall be n.

(S504-3) Each bit of h1, h2, - - - is ORed. This is regarded as an n-dimensional vector and is called a characteristic vector.

The similarity of the two deposited data pieces can be made to approximate to the number of bits in which they are both 1 in the characteristic vector using the characteristic vector calculated as described above. That is, the number of bits 1 included in a result of ANDing respective bits of hash values corresponding to the two deposited data pieces is the similarity. For the details of the characteristic vector, refer to Non-patent Literature 5.

In addition, similarity can be calculated using a quantity called a fuzzy hash as a calculable characteristic quantity without extracting words. The fuzzy hash is calculated according to the following procedure.

(S504-$a$) The deposited data is divided. A method of dividing the deposited data so that a specific bit string is a boundary is known in addition to a method of dividing at fixed length.

(S504-$b$) A hash value (h1, h2, - - - ) of each divided data piece (d1, d2, - - - ) is calculated.

(S504-$c$) An array of the hash values (h1, h2, - - - ) is output as a fuzzy hash.

When the fuzzy hash H=(h1, h2, - - - ) corresponding to the corresponding deposited data piece and a fuzzy hash F=(f1, f2, - - - ) corresponding to another deposited data piece are used, the similarity of the two deposited data pieces can be made to approximate to the ratio n/(N−n) of the number of elements (the number "n" of hash values included in both H and F) in a set of the product of (h1, h2, - - - ) and (f1, f2, - - - ) to the number of elements (a number acquired by subtracting "n" from the sum N of the is number of the elements in both H and F) in a set of the sum of (h1, h2, - - - ) and (f1, f2, - - - ). When the number of elements in H and F is m1 and m2, N=m1+m2, 0=<n=<min(m1, m2)<N.

Various fuzzy hash techniques have been proposed. For the details, refer to Non-patent Literature 6.

Next, the data transmission/reception process S52 proceeds according to the following procedure.

(S520) A channel for the transmission/reception of data between the registered client 20 and the database server 40 is established. Specifically, the authentication unit 418 first authenticates a user based upon ID, a password and the like of the user of the registered client 20 via the communication interfaces 232, 462 and the user interface 230. When the authentication unit judges that the user is a normal user registered beforehand, the authentication unit 418 establishes the channel between the registration unit 220 of the registered client 20 and the registration unit 420 of the database server 40. At this time, the authentication unit 418 also collects identification information such as an IP address of the registered client 20 and stores it in the storage device 416. This identification information is required in a case that a key is shared between the search client 30 and the registered client 20. The details will be described using FIGS. 6 and 7 later. When the authentication unit judges that the user is not a normal user, it establishes no channel and terminates the processing.

(S522) The registration unit 220 transmits registered data (a set of encrypted data, a secure index and characteristic quantity) to the database server 40 via the communication interface 232.

(S524) The registration unit 420 receives the registered data transmitted via the communication unit 462 and stores it in the storage device 416. Concrete contents of registration will be described using FIG. 6 later.

(S526) The registration unit 420 notifies the registration unit 220 of the registered client 20 of the completion of registration via the communication interface 462.

(S528) The authentication unit 418 releases the channel established between the registration unit 220 of the registered client 20 and the registration unit 420 of the database server 40.

According to the above procedure, the user of the registered client 20 can deposit the user's own data in the database server 40 without making the contents of the data known to the manager of the database server 40 and a third party on the channel.

The database server 40 performs the clustering S54 of the registered data after the registration of the data. For a representative clustering method, K-means clustering and hierarchical clustering are known. First, the K-means clustering is performed according to the following procedure. The number of characteristic quantities shall be N.

(S54-1) The centers of "K" clusters are set at random. Or when plural secure indexes included in each cluster are arranged in predetermined order, the secure index located in the center of the order is set as the center of the corresponding cluster.

(S54-2) The similarity of each characteristic quantity xi (i=1, 2, - - - , N) and "K" centers is calculated and the most similar center is acquired. The characteristic quantity/quantities xi is/are allocated to the cluster to which the corresponding center belongs.

(S54-3) When the allocation of all the characteristic quantities to the cluster is unchanged, the process is finished. In other case, the process is returned to the step S54-2 after the center of each cluster is recalculated based upon the allocated characteristic quantity.

A result depends upon random setting of the first cluster. However, since the quantity of calculation is in the order of "nK", there is a merit that calculation is performed by relatively fast operation. For the details, refer to Non-patent Literature 7.

In the K-means clustering, the center of a cluster is required to be calculated based upon characteristic quantities which belong to the same cluster. When characteristic quantities xk (k=1, - - - , m) which are respective sizes of "m" pieces of deposited data included in a certain cluster belong to the certain cluster in a case that the size of the deposited data is used for characteristic quantity, its center v is acquired by calculating (x1+ - - - +xm)/m.

When an "ith" element of a center vector "v" is "vi" and an "ith" element of a characteristic vector "xk" configured by "n" characteristic quantities of deposited data "k" included in a cluster including the "m" pieces of deposited data is "xk,i" (i=1, - - - , n) in a case that a characteristic vector is used for characteristic quantity, the ratio (ui/<xi>) of the standard deviation "ui" and a data of "xk,i" is ((ui/<xi>)=<(1/C), that is, (<xi>/ui)>=C) if the ratio is smaller than 1/C (C: constant of 2 to approximate 10), since a lot of "xk, i" concentrate in the vicinity of the mean value <xi>, it means that "ith" characteristic quantity of "n" characteristic quantities is effective as characteristic quantity of the cluster, in that case, vi=1, in other case (the "ith" characteristic quantity is not effective as the characteristic quantity of the cluster, vi=0, and the center vector "v" (v1, - - - , vn) having "vi" which is 1 or 0 as an element can be acquired. That is, the center vector "v" is a characteristic quantity vector showing which characteristic quantity of "n" characteristic quantities is effective as a characteristic quantity of the cluster.

In addition, when the above-mentioned <xi> is positive, the element "vi" (1 or 0) which is acquired by the above-mentioned discriminant of the center vector is expressed as [pi]−[|pi−1|] using Gauss' notation. However, pi=(<xi>/(ui·C)).

In the meantime, as the calculation of similarity is special when a fuzzy hash is used for a characteristic quantity, it is difficult to acquire the center based upon the characteristic quantity.

If only similarity can be calculated, hierarchical clustering can be given even if the characteristic quantity is any characteristic quantity for a method in which clustering is possible. This is performed according to the following procedure.

(S54-a) N clusters including only one characteristic quantity are generated.

(S54-b) Distance between the following clusters is calculated based upon distance (dissimilarity) between respective characteristic quantities xi and xj of clusters i and j and the closest two clusters are sequentially merged into one cluster.

(S54-c) This merger is repeated until all objects are merged into one cluster.

Output by hierarchical clustering has a tree structure called a dendrogram. The dendrogram tells not only the belongings of data to a cluster but distance between data pieces in the cluster. It is known that the quantity of calculation can be inhibited up to the square of N by devising the merger of a cluster. For the details, refer to Non-patent Literature 8.

As a summary, according to the K-means clustering, fast operation is acquired. However, it can be applied to only a case that the center can be determined based upon a characteristic quantity. According to the hierarchical clustering, operation is slower than the operation in the K-means clustering. However, any data can be clustered if only similarity can be calculated.

FIG. 6 shows respective data configuration of a registered data storage location management table 60 and a cluster management table 62 respectively prepared by the database server. The registration unit 420 of the database server 40 prepares the registered data storage location management table 60 and stores it in the storage device 416 when the registration unit receives a set (registered data) of encrypted data, a secure index and characteristic quantity from the registered client 20.

The registered data storage location management table 60 is provided with a registered ID column 600 that stores registered data ID for uniquely identifying registered data, an encrypted data column 602 that records a storage location in the storage device 416 of the received encrypted data, a secure index column 604 that records a storage location in the storage device 416 of the secure index, a characteristic quantity column 606 that records a storage location in the storage device 416 of the characteristic quantity, a registered client column 608 that stores identification information of the registered client 20 which registers encrypted data and the like and a column 608 that stores the other required items.

The registration unit 420 issues registered data ID so that registered data can be uniquely identified by increasing a value by 1 every time registered data is added.

For information to be recorded in the encrypted data column 602, the secure index column 604 and the characteristic quantity column 606, a file name and a sector address in the storage device 416 respectively of encrypted data and the like can be given. Since the data volume of characteristic quantity is less than that of encrypted data, the characteristic quantity may also be directly stored in the characteristic quantity column 606.

For information to be stored in the registered client column 608, an IP address of the registered client 20 that registers encrypted data and the like can be given. The authentication unit 418 acquires this information in the step S520 shown in FIG. 5, and this information is required in a case that a key is shared between the search client 30 and the registered client 20. The details of a key sharing process will be described using FIG. 7 later.

Further, for information to be stored in the column 608, a date on which data is registered can be given.

The clustering unit 430 records a result of clustering in the cluster management table 62 using a characteristic quantity and stores it in the storage device 416. The cluster management table 62 includes a cluster ID column 620 that stores a cluster ID for uniquely identifying a cluster, a registered data ID column 622 that stores the registered data ID 600 of registered data which belongs to the cluster and a column 624 that stores the other required items. For information to be stored in the column 624, information related to the center of a cluster in the K-means clustering can be given.

(Details of Secure Search Process)

The characteristic quantity calculation method, the clustering method, the units and the devices for realizing these have been described. These methods and the units/devices are equivalent to so-called prior preparation required for accelerating a secure search. The details of the secure search process executed by the database server will be described below.

(Search Process by Search Client and Database Server)

Figure 7:
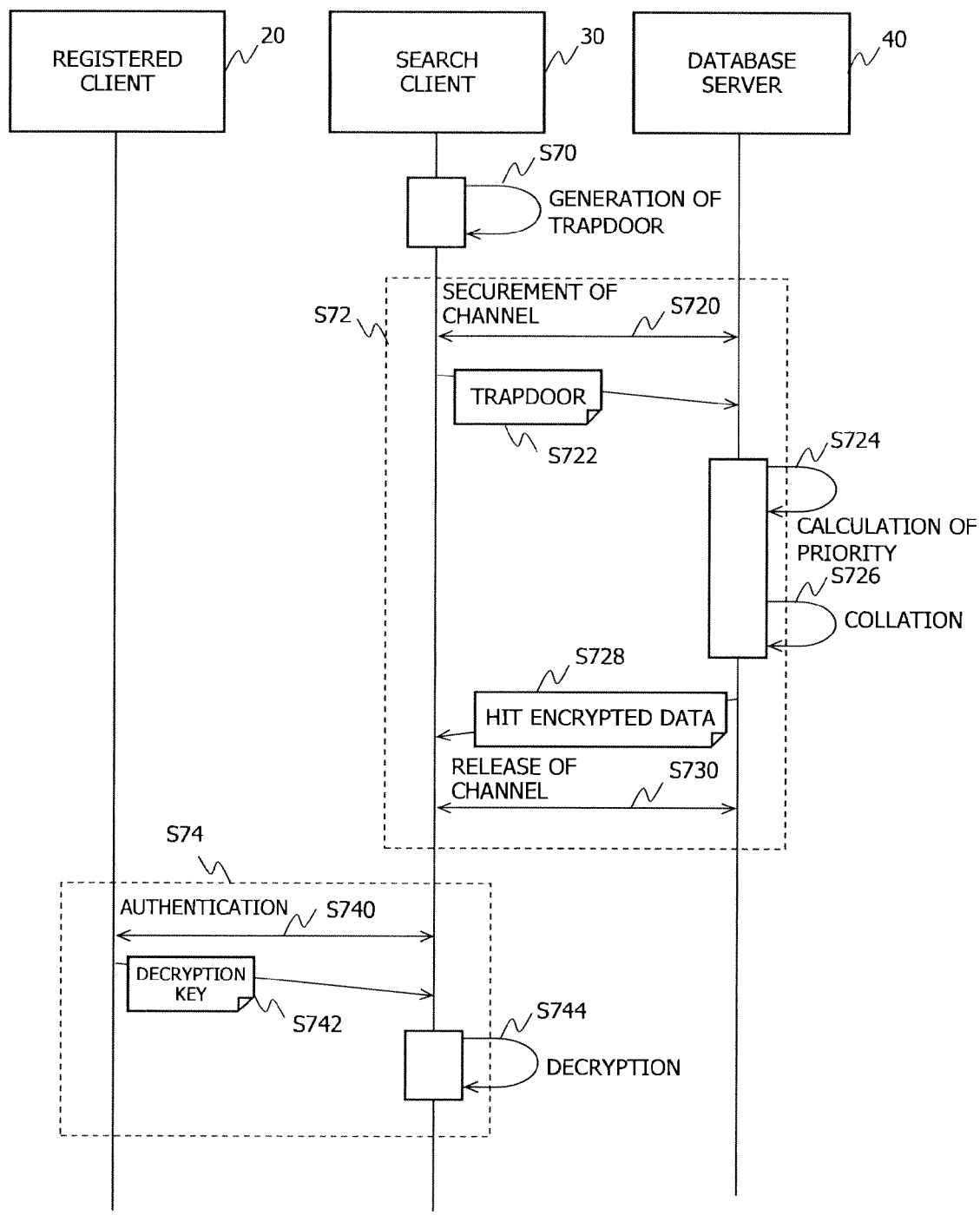
FIG. 7 shows a sequence of a secure search process between the search client and the database server in the embodiment of the present invention.

FIG. 7 shows a sequence of the search process by the search client and the database server. The data registration process will be described referring to FIG. 7 below, and respective concrete processing of the key sharing procedure described in relation to FIGS. 2, 3 and 6 and the trapdoor generating procedure described in relation to FIG. 3 will be described below.

The secure search process executed by the search client 30 and the database server 40 roughly includes a trapdoor generation step S70 in which the search client 20 generates a trapdoor based upon a search query, a secure search step S72 for searching between the search client 20 and the database server 40 and a decryption step S74 for sharing a decryption key between the registered client 20 and the search client 30 and decrypting an encrypted data.

The search unit 320 of the search client 20 receives the search query from a user via the user interface 330 and generates a trapdoor based upon the search query under control over the trapdoor generator 322 in the trapdoor generation step S70. A concrete example of the trapdoor generation step S70 based upon Non-patent Literature 1 is as follow.

(S70-1) The hash function used in a secure index generation step (S502-2) is prepared.

(S70-2) A hash value of a search query (a search keyword) is calculated using the hash function (securing the search keyword). This turns a trapdoor.

Since the hash value of the search query is used, it is difficult to specify the search query based upon the trapdoor.

A method of collating the trapdoor and the secure index respectively acquired as described above will be clarified in description in relation to FIG. 9 later.

The secure search step S72 proceeds according to the following procedure.

(S720) A channel for transmitting and receiving data is established between the search client 30 and the database server 40. Specifically, the authentication unit 418 first authenticates a user based upon ID and a password of the user of the search client 30 via the communication interfaces 332, 462 and the user interface 330. When the authentication unit judges that the user is a normal user registered beforehand, the authentication unit 418 establishes a channel between the search unit 320 of the search client 30 and the search unit 440 of the database server 40. When the authentication unit judges that the user is not normal user, it establishes no channel and finishes the process.

(S722) The search unit 320 transmits a trapdoor to the database server 40 via the communication interface 332. The search unit 440 of the database server 40 receives the trapdoor via the communication interface 462.

(S724) The priority calculator 442 of the search unit 440 calculates the priority of collation by collating the received trapdoor and a part of a secure index stored in the storage device 416. A concrete priority calculation procedure will be described using FIG. 8.

(S726) The search unit 440 controls the collator 444 based upon the priority acquired in the step S724 so as to collate the trapdoor and the secure index in higher order of the priority. A concrete collation procedure will be described using FIG. 9 later.

(S728) The search unit 440 returns hit encrypted data to the search unit 320. In addition, the search unit 440 also returns an IP address of the registered client 20 stored in the registered client column 608 of the registered data storage location management table 60. The reason is that they are required for the search client 30 to acquire a decryption key in the following decryption step S74.

(S730) The authentication unit 418 releases the channel established between the search unit 320 and the search unit 440.

Next, the decryption step S74 will be described. To decrypt the encrypted data acquired as a result of the search, the decryption key is required to be shared with the registered client 20. For a method of sharing the key, a method of sharing a key using a public key cryptosystem utilized in an SSL (secure sockets layer) and a method of sharing DH (Diffie-Hellman) key utilized in IPSec (security architecture for Internet protocol) are known. A concrete procedure of the method of sharing the key using the public key cryptosystem will be described below.

(S740) The key sharer 324 extracts identification information such as an IP address of the registered client 20 that registers encrypted data and the like from the result of the search received from the database server 40. The registered client 20 owns a decryption key of the encrypted data. Before sharing the decryption key, it is first required to be certified that the search client 30 is a normal client that does not spoof. The key sharer 324 authenticates the registered client 20 according to the following procedure.

(S740-1) The key sharer 324 connects with the registered client 20 based upon an IP address of the registered client 20 via the communication interface 332.

(S740-2) The key generator 218 of the registered client 20 requests a certificate for the key sharer 324 of the search client 30 via the communication interface 232. In this case, the certificate is a certificate in which a reliable third party (CA: Certificate Authority) applies an electronic signature to a public key of the search client 30.

(S740-3) The key sharer 324 transmits the certificate to the registered client 20.

(S740-4) The key generator 218 verifies the signature of the certificate and acquires the public key of the search client 30. When the verification of the signature fails, the channel is disconnected for a reason that the certificate is unjust, and the process is finished.

(S740-5) The key sharer 324 generates a message, adds a message digest to it, encrypts it with a secret key which the key sharer 324 owns, and transmits it to the key generator 218.

(S740-6) The key generator 218 decrypts the message using the public key of the key sharer 324. The key generator creates a message digest based upon the decrypted message and compares the message digest with the message digest added by the key sharer 324. When the coincidence of both message digests is verified, it is determined that the message which is not falsified is received from the normal search client 30 and the authentication is completed. If not, it is determined that the search client 30 is not a normal client, the channel is disconnected, and the process is finished.

In the authentication procedure described in (S704-1) to (S740-6), all the normal search clients 30 to which the normal certificate is issued by the CA can decrypt the encrypted data independent of an intention of a user of the registered client 20. To limit a destination of the transmission of the decryption key, a method that the key generator 218 also reads identification information of the search client 30 from information of a connection source, a certificate and the like when connection is made by the search client 30 in the step S704-1 and when the certificate is verified in the step S740-4 and the channel is disconnected not to transmit the decryption key to a device except the predetermined search client has only to be taken. For a destination of the transmission of the decryption key, a user can specify it via the user interface 230.

After the authentication is completed, the search client 30 acquires a decryption key from the registered client 20 according to the following procedure.

(S742) The key generator 218 of the registered client 20 encrypts a decryption key owned by itself with the public key acquired from the certificate and transmits it to the key sharer 324 of the search client 30 via the communication interface 232. The key sharer 324 decrypts the encrypted decryption key with its own secret key and acquires the desired decryption key.

(S744) The decryption device 326 decrypts the encrypted data using the decryption key acquired in S742 and the search process is completed.

According to the above-mentioned procedure, the user of the search client 30 can acquire a predetermined search result without substantially making the contents of the search query and the search result and known to the manager of the database server 40 and a third party on the channel.

(Determination of Priority)

Figure 8:
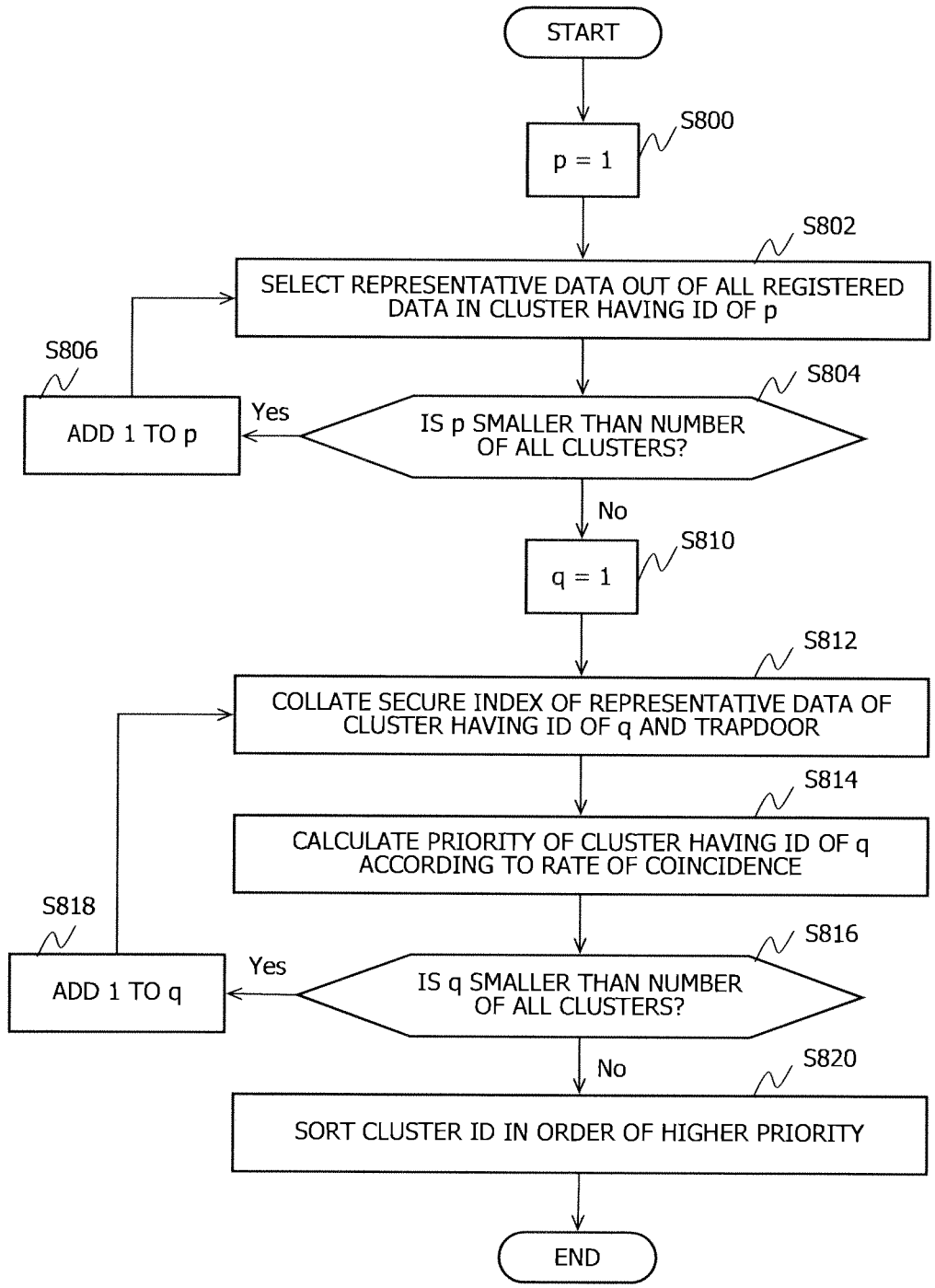
FIG. 8 is a flowchart showing a procedure for calculating priority by the database server in the embodiment of the present invention.

FIG. 8 is a flowchart showing a procedure for a priority calculation step S724 executed by the database server 40. The priority calculation process executed after a trapdoor is received from the search client 30 will be described referring to FIG. 8 below. Concrete processing for the collation of the secure index and the trapdoor described in relation to FIG. 5 will be also described. The priority calculator 442 of the search unit 440 of the database server 40 executes all the following processing.

(S800) "1" is set as a variable p for counting clusters.

(S802) Representative data is selected out of all registered data which belongs to the cluster having cluster ID of p. The representative data may also be selected out of all the registered data that belongs to the corresponding cluster at random and when the K-means clustering is used, the registered data closest to the center of the corresponding cluster may also be representative data. For example, when registered data in a cluster is arranged in predetermined order, data located in the vicinity of the center of the whole order is made to be representative data.

(S804) When the variable p is smaller than the number of all clusters, p is added by 1 (S806), the processing is returned to S802, and the similar processing is executed in relation to the next cluster. If not, the processing proceeds to a step S810.

(S810) "1" is set to a variable q for counting clusters.

Figure 14:
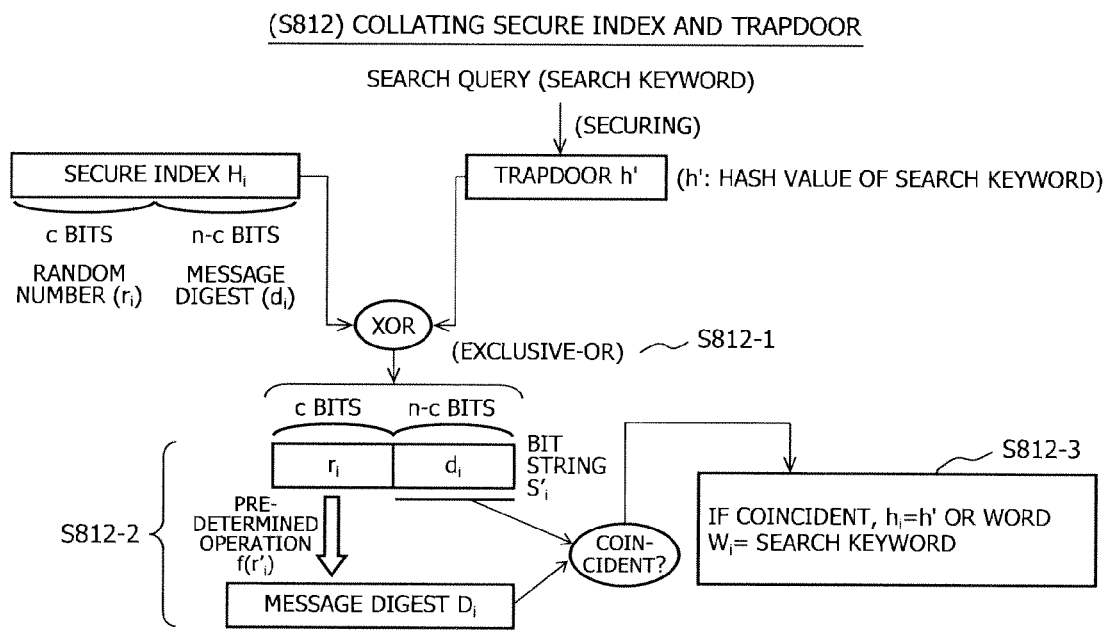
FIG. 14 shows a procedure for collating the secure index and the trapdoor.

(S812) A secure index of representative data of a cluster ID of which is q and a trapdoor are collated. An example of a concrete collation method based upon Non-patent Literature 1 is as follows. FIG. 14 shows a procedure for collating the secure index and the trapdoor. The secure index Hi acquired in (S502-1) to (S502-4) shown in FIG. 13 is assumed to have been generated by the exclusive-OR of the hash value hi generated based upon the word Wi in the deposited data and the bit string acquired by connecting the random number sequence ri with its message digest di (i=1, 2, - - - ). In addition, the trapdoor acquired according to the procedure in (S70-1) to (S70-2) shall be h'. A subscript "i" means an identifier for respective words included in deposited data.

(S812-1) The exclusive-OR of the secure index Hi and the trapdoor h' is operated for each word Wi.

(S812-2) As in the step S502-3, the same predetermined operation as that in the step S502-3 shown in FIG. 13 is performed from a bit string r'i of leading c bits of the exclusive-OR (a bit string S'i), the message digest Di is calculated, and the Di is compared with a bit string d'i of latter-half n-c bits of the exclusive-OR.

(S812-3) If hi=h', that is, if an original word Wi and a search keyword are coincident, only the random number sequence ri and its message digest di are to be left by exclusive-ORing the digest Di and the bit string d'i. Therefore, if the message digest Di of r'i is coincident with d'i, it can be judged that hi is equal to h' and the deposited data corresponding to the secure index includes the search query (the search keyword) corresponding to the trapdoor. Hereinafter, this phenomenon is simply called a hit in a search. When the message digest Di is not coincident with d'i, it is judged that deposited data corresponding to the secure index does not include the search query corresponding to the trapdoor.

Next, algorithm for determining the coincidence of the search query and the trapdoor in the steps S812-2, S812-3 will be described referring to FIG. 14.

When exclusive-OR is XOR, a complement (negation) of a set A is "¬", OR is "+", AND is "·" and the connection of two bit strings is "|", the exclusive-OR of three sets is generally (A XOR B) XOR C=X·B+¬X·¬B and X=¬(A XOR C), ¬X=(A XOR C). In this case, when A=hi (the hash value of the word wi), B=(ri|di)(a bit string Si configured by the random number sequence ri and the message digest di) and C=h' (the trapdoor), X=hi XOR ¬h', ¬X=hi XOR h'. Especially, when hi=h', X=1, ¬X=0.

When the exclusive-OR of the secure index Hi and the trapdoor h' is Hi XOR h'=(r'i|d'i) (a bit string S'i configured by the random number sequence and the message digest) (S812-1) and the above-mentioned representation of Hi is assigned to Hi on the left side, r'i=X·ri+¬X·¬ri and d'i=X·di+¬X·¬di.

Since X=1, ¬X=0 if hi=h' if hi=h', r'i=ri and d'i=di. Accordingly, as the message digest Di based upon the trapdoor is "f(r'i)=f(ri)=di (S812-2)" and further, d' i=di, Di=d'i (S812-3).

Accordingly, if hi=h', that is, the word Wi is the search keyword, Di=d'i (S812-3).

Collation with the trapdoor is enabled by utilizing properties of the random number sequence and the exclusive-OR even if an unciphered text and an encrypted text are not 1 to 1. For the details, refer to Non-patent Literature 1. The representative data (the registered data) in the cluster, especially the secure index in the registered data is also called a pivot.

(S814) The priority of the cluster at which cluster ID is q is calculated so that the larger a rate of the coincidence of the secure index and the trapdoor is, the higher the priority is. When there is just one trapdoor, the rate of the coincidence is provided at a binary showing whether a hit occurs in a search or not. Since there are plural trapdoors when plural search keywords are specified and an AND (logical product) search of these or an OR (logical OR) search of these is made, the rate of the coincidence is provided by the ratio of the number of trapdoors that hit in the search and all the trapdoors.

(S816) When the variable q is smaller than the number of all clusters, q is added by 1 (S818), the process is returned to the step S812, and as for the next cluster, the similar processing is performed. If not, the process proceeds to a step S820.

(S820) The priority calculator 442 sorts cluster IDs so that the priority is higher and outputs a result of the sort to the memory 414 or the storage device 416. Thereby, the priority calculation process is finished.

(Collation of Registered Data Based Upon Priority of Cluster)

Figure 9:
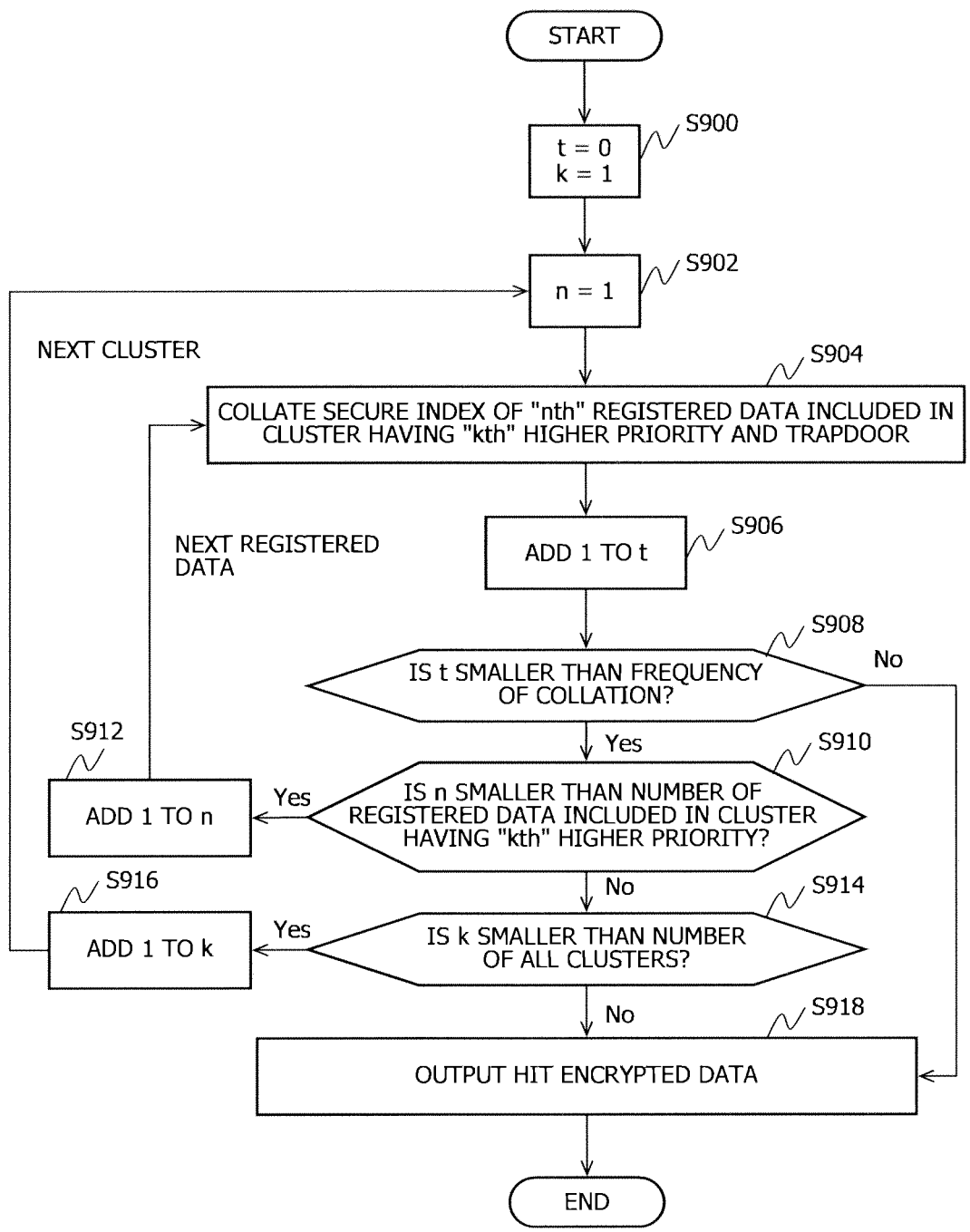
FIG. 9 is a flowchart showing a procedure for collating a secure index and a trapdoor by the database server in the embodiment of the present invention.

FIG. 9 is a flowchart showing a procedure for the collation of the secure index and the trapdoor (the step S812 shown in FIG. 8) executed by the database server 40. The embodiment of the present invention has a characteristic that the acceleration of secure search processing is realized while inhibiting the deterioration of security and search precision by sequentially collating the subsequent objects after the priority of objects to be collated is determined using a characteristic quantity of deposited data and discontinuing the collation at the fixed frequency. Hereinafter, the number of times in which collation is performed is called a collated frequency. The collated frequency is set by a user of the registered client 20 via the user interface 230 beforehand. The setting of the collated frequency will be described using FIG. 11 later.

The processing for collating the secure index and the trapdoor is performed according to the following procedure. The following processing (except S904) is all executed by the search unit 440.

(S900) A variable t as a result of counting the collated frequency is set to 0 (zero) and a variable k as a result of counting clusters is set to 1.

(S902) A variable n as a result of counting registered data in the cluster is set to 1. The priority output by the priority calculator 442 in the step S820 is read from the memory 414 or the storage device 416, and the cluster Ck having the "kth" higher priority is specified.

(S904) The collator 444 collates a secure index of the "nth" registered data included in the cluster Ck and a trapdoor. When they are hit, corresponding registered data ID is temporarily output to the memory 414 or the storage device 416 together with a rate of the coincidence of the secure index and the trapdoor. When they are not hit, nothing is output.

(S906) The variable t showing the collated frequency is added by 1.

(S908) When the variable t is smaller than a predetermined collated frequency, the processing proceeds to the next step S910. If not, the processing proceeds to a step S918 and the processing is finished.

(S910) When the variable n as a result of counting registered data is smaller than the number of all registered data included in the cluster Ck, "n" is added by 1 (S912), the processing is returned to the step S904, and the similar processing is applied to the next registered data in the cluster. If not, the processing proceeds to a step S914.

(S914) When the variable k showing priority is smaller than the number of all clusters, "k" is added by 1 (S916), the processing is returned to the step S902, and the similar processing is applied to the cluster having the next higher priority. If not, the processing proceeds to the step S918.

(S918) The search unit 440 outputs encrypted data corresponding to the register data ID temporarily output to the memory 414 or the storage device 416 by the collator 444 to the memory 414 or the storage device 416 together with the rate of the coincidence. Thereby, the collation processing of the secure index and the trapdoor is finished.

Suppose that the registered client 20 registers 1000 pieces of deposited data including a keyword, "cloud" and 9000 pieces of deposited data not including "cloud" in the database server 40 in this embodiment. The database server 40 divides the registered deposited data into two, which are a cluster A that includes "cloud" and a cluster B that does not include "cloud" by clustering processing, and manages the registered data. When the search client 30 searches with a search query of "cloud", the 1000 pieces of registered data in the cluster A are preferentially collated by collating the search query (the trapdoor) and a pivot (a representative of secure indexes). Therefore, even if the collation is discontinued at 1000 times, all the 1000 pieces of deposited data including "cloud" are hit. In the meantime, in the conventional type secure search system using a searchable code, all 10000 pieces of registered data are collated with a trapdoor, "cloud" in a search query and for the first time, all deposited data including "cloud" are hit. Accordingly, can accelerate a search rate by 10 times, compared with the related art. As described above, the secure search can be accelerated while inhibiting the deterioration of security and search precision by clustering secure indexes using characteristic quantity based upon which original data is difficult to guess according to the embodiment of the present invention described using FIGS. 1 to 9.

Figure 10:
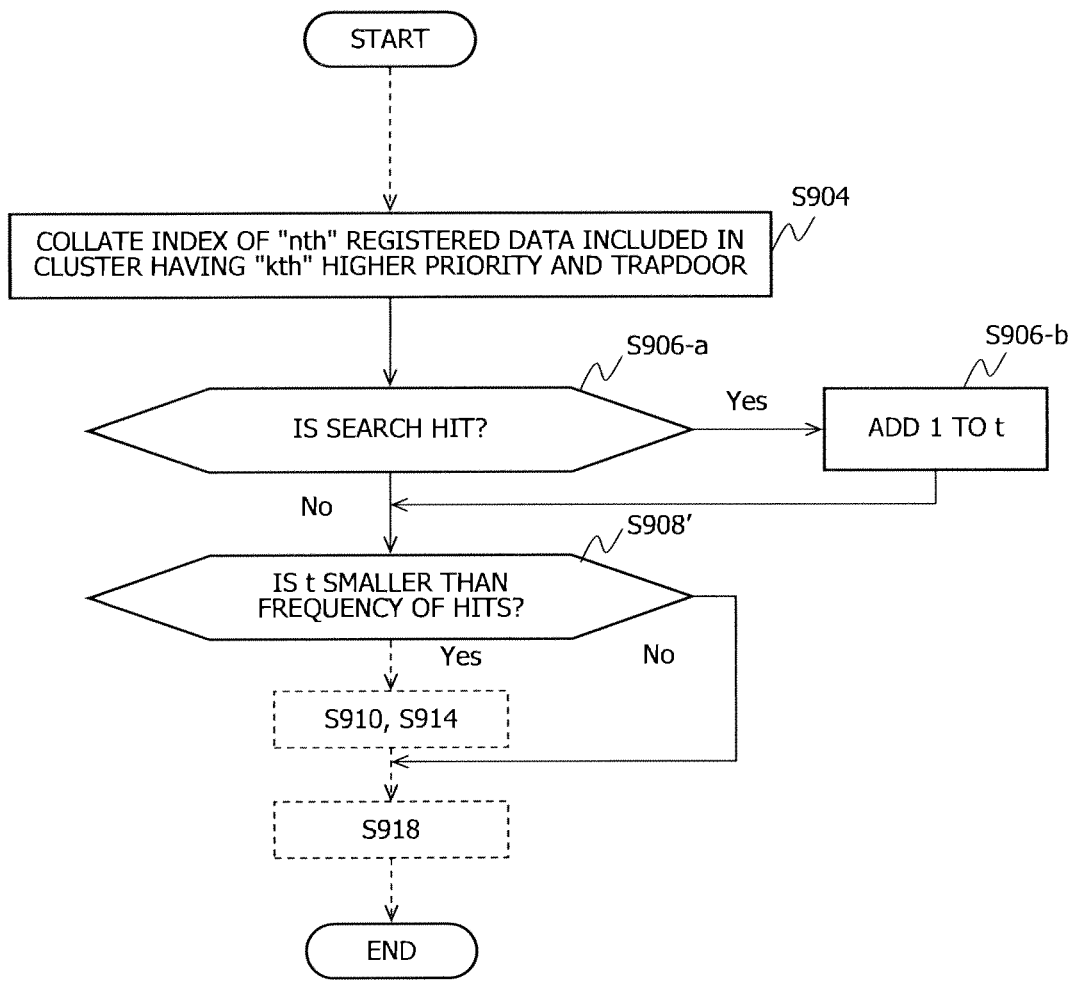
FIG. 10 is a flowchart showing a procedure for collating the secure index and the trapdoor by the database server in the embodiment of the present invention.

FIG. 10 is a flowchart showing a procedure for collating a secure index and a trapdoor performed by the database server 40. In the example shown in FIG. 9, the acceleration of the secure search process is realized by discontinuing the collation at the fixed frequency. However, acceleration can also be realized by discontinuing collation not at a collated frequency but at a frequency at which a search hits (hereinafter called a frequency of hits). Specifically, the steps S906 and S908 shown in FIG. 9 are replaced with the following steps S906-*a*, S906-*b* and S908'. The following processing is all executed by the search unit 440.

(S906-*a*) The collator 444 judges whether a search hits or not. When the search hits, the processing proceeds to S906-*b*. When the search does not hit, the processing proceeds to the step S908'.

(S906-*b*) The variable t showing the collated frequency is added by 1.

(S908') When the variable t is smaller than a predetermined frequency of hits, the processing proceeds to the next S910. If not, the processing proceeds to S918 and the processing is finished.

The frequency of hits is set by a user of the registered client 20 via the user interface 230 beforehand. The setting of the frequency of hits will be described using FIG. 11 later.

Since collation is repeated until a frequency of hits reaches the preset frequency of hits in the method shown in the flowchart in FIG. 10, the method has an advantage that the omission of a search is reduced, compared with the search method described in relation to FIG. 9. On the other hand, the method shown in the flowchart in FIG. 10 has a shortcoming that if no search hits, a search is delayed. In the meantime, in the method described in relation to FIG. 9, since collation is made by only the preset collated frequency, the method has a shortcoming that the omission of a search is more apt to occur than that in the method shown in FIG. 10. However, the method described in relation to FIG. 9 has an advantage that search response time is kept fixed regardless of a result of the search.

FIG. 11 shows a setting screen on the search client 30 or the database server 40. For the parameter set by the setting device 328 of the search client 30 and described in relation to FIG. 3, a collated frequency can be given.

Dialog boxes 1100, 1120 are an example of a screen which the setting device 328 presents to a user via the user interface 330 to let the user set a collated frequency. In the dialog box 1100, while the collated frequency is decreased as a slide bar 1102 is moved leftward and a search rate is enhanced, the possibility that registered data is hit in a search decreases and search precision is deteriorated. While the collated frequency is increased as the slide bar 1102 is moved rightward and the search rate is reduced, the search precision is enhanced. According to a position of the slide bar 1122, the collated frequency is set to a predetermined value held by the setting device 328. In addition, the user can also directly set the collated frequency in an input box 1122 in the dialog box 1120. In the embodiment described in relation to FIG. 10, the above-mentioned collated frequency can be replaced with a frequency of hits.

In addition, an embodiment in which the collated frequency (or the frequency of hits) is set by the manager of the database server 40 is also allowed. In this case, the setting unit 450 of the database server 40 presents the dialog boxes 1100, 1120 via the user interface 460. When the manager of the database server 40 periodically checks the number of registered data and a state of clustering and adjusts the collated frequency to prevent search response time from being delayed, the quality of secure search service can be guaranteed.

REFERENCE SIGNS LIST

10: Network, 20-1 to 20-*n*, 20: Registered client, 30-1 to 30-*m*, 30: Search client, 40: Database server, 200, 300, 400: Internal bus, 212, 312, 412: CPU, 214, 314, 414: Memory, 216, 316, 416: Storage device, 230, 330, 460: User interface, 232, 332, 462: Communication interface, 218: Key generator, 220: Registration unit, 222: Encryption device, 224: Secure index generator, 226: Characteristic quantity calculator, 228: Setting device, 320: Search unit, 322: Trapdoor generator, 324: Key sharer, 326: Decryption device, 328: Setting device, 418: Authentication unit, 420: Registration unit, 430: Clustering unit, 432: Similarity calculator, 440: Search unit, 442: Priority calculator, 444: Collator, 450: Setting unit, S50: Data generation process, S52: Data transmission/reception process, S54: Clustering process, 60: Registered data storage location management table, 600: Registered data ID column, 602: Encrypted data column, 604: Secure index column, 606: Characteristic quantity column, 608: Registered client column, 610: Column storing other required items, 62: Cluster management table, 620: Cluster ID column, 622: Registered data ID column, 624: Column storing other required items, S70:

Trapdoor generation step, S72: Secure search step, S74: Decryption step, 1100, 1120: Dialog box, 1102: Slide bar, 1122: Input box

The invention claimed is:

1. A secure search device that receives data from a registered client and receives information for a search from a search client, the secure search device comprising:
a receiver that receives, from the registered client, a set of encrypted data acquired by encrypting the data, a secure index acquired by securing an index extracted from the data and a characteristic quantity for calculating similarity between data pieces;
a similarity calculator that calculates the similarity of two data pieces based upon the characteristic quantity received from the registered client;
a clustering unit that clusters the encrypted data received from the registered client based upon the similarity calculated by the similarity calculator;
a priority calculator that receives a trapdoor acquired by securing a search keyword included in a search query for searching data registered in the secure search device from the search client and calculates the priority of collation of the clustered encrypted data and the trapdoor based upon a result of clustering generated by the clustering unit;
a collator that collates the secure index received from the registered client and the trapdoor; and
a search unit that collates the encrypted data and the trapdoor by the collator based upon the priority calculated by the priority calculator in the order of clusters having higher priority by a predetermined frequency when the trapdoor is received from the search client, and returns the encrypted data that hits the trapdoor to the search client.

2. The secure search device according to claim 1,
wherein the clustering unit generates one or more clusters and sets the center of each cluster at random;
the clustering unit instructs the similarity calculator to calculate the similarity of the centers of all data received from the registered client based upon a characteristic quantity included in each data piece and allocates each data piece to the clusters to which the most similar centers belong;
the clustering unit finishes the processing of all the data received from the registered client when allocation to the clusters is unchanged; and
the clustering unit otherwise repeats processing for acquiring the center after the center of each cluster is recalculated using a characteristic quantity of data which belongs to the corresponding cluster.

3. The secure search device according to claim 1,
wherein the clustering unit generates as many clusters including only one of data pieces received from the registered client as the number of the data pieces;
the clustering unit instructs the similarity calculator to calculate distance between clusters using a characteristic quantity of data which belongs to each cluster and successively merges two clusters having the shortest distance; and
the clustering unit repeats the merger until all objects are merged into one cluster.

4. The secure search device according to claim 1,
wherein the priority calculator selects one of all data pieces which belong to each cluster as representative data for every cluster;
the collator is instructed to collate a secure index of the representative data of each cluster and the trapdoor;
the priority calculator calculates the priority of the cluster to be higher priority as a rate of coincidence with the trapdoor is larger; and
the priority calculator sorts the order of the collation of data included in the cluster to be higher priority.

5. The secure search device according to claim 1,
wherein the collator applies exclusive-OR to the secure index and the trapdoor;
the collator extracts a bit string having the same length as a random number sequence generated in generating the secure index from the head of the exclusive-OR and calculates a message digest of the bit string;
the collator judges that the secure index includes a search query corresponding to the trapdoor when the message digest is coincident with a bit string of which the message digest of the exclusive-OR is not calculated; and
the collator judges that the secure index does not include the search query corresponding to the trapdoor when the message digest is not coincident with the bit string.

6. The secure search device according to claim 1,
wherein the search client sets a frequency of collation performed by the search unit.

7. The secure search device according to claim 1,
wherein the secure search device sets a frequency of collation performed by the search unit.

* * * * *